United States Patent
Marsala et al.

(10) Patent No.: US 11,345,185 B2
(45) Date of Patent: *May 31, 2022

(54) SYSTEM AND METHOD FOR SELECTING PAINT COMPOSITIONS BASED ON EXPECTED PAINT APPLICATION CONDITIONS

(71) Applicant: Spray-Net Franchises Inc., Quebec (CA)

(72) Inventors: Carmelo Marsala, Quebec (CA); Peiman Arabi, Quebec (CA)

(73) Assignee: SPRAY-NET FRANCHISES INC., Québec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/953,523

(22) Filed: Nov. 20, 2020

(65) Prior Publication Data

US 2021/0070097 A1   Mar. 11, 2021

Related U.S. Application Data

(63) Continuation of application No. 16/339,576, filed as application No. PCT/CA2016/051156 on Oct. 4, 2016, now Pat. No. 10,864,767.

(51) Int. Cl.
| | |
|---|---|
| *B44D 3/00* | (2006.01) |
| *B05D 7/04* | (2006.01) |
| *B05D 7/24* | (2006.01) |
| *G05B 13/02* | (2006.01) |
| *B01F 33/84* | (2022.01) |
| *B05D 7/00* | (2006.01) |

(Continued)

(52) U.S. Cl.
CPC .......... *B44D 3/003* (2013.01); *B01F 33/8442* (2022.01); *B05D 7/00* (2013.01); *B05D 7/04* (2013.01); *B05D 7/24* (2013.01); *G05B 13/028* (2013.01); *G05D 21/02* (2013.01); *B01F 2101/30* (2022.01)

(58) Field of Classification Search
CPC ....... B44D 3/003; B05D 7/24; B01F 13/1063; B01F 13/1066; B01F 2215/005; B64D 3/003
USPC ............................................ 700/233, 239
See application file for complete search history.

(56) References Cited

U.S. PATENT DOCUMENTS

| | | |
|---|---|---|
| 5,626,958 A | 5/1997 | D'Herbercourt et al. |
| 6,714,924 B1 | 3/2004 | McClanahan |

(Continued)

FOREIGN PATENT DOCUMENTS

KR    100500408    7/2005

*Primary Examiner* — Timothy R Waggoner
(74) *Attorney, Agent, or Firm* — Leason Ellis LLP

(57) ABSTRACT

Expert system and method for computing an adjustment procedure for obtaining an adjusted exterior waterborne paint composition for an exterior surface to be painted at a paint application site on a specific date. A starting exterior waterborne paint composition comprises base chemical compounds. When one or more computed target values of target chemical compounds for the adjusted exterior waterborne paint composition are determined different from the plurality of base values, the adjustment procedure is computed for transforming the starting exterior waterborne paint composition into the adjusted exterior paint composition and instructions comprising the adjustment procedure are sent to a remote device.

19 Claims, 3 Drawing Sheets

(51) Int. Cl.
    *G05D 21/02*     (2006.01)
    *B01F 101/30*     (2022.01)

(56)     References Cited

U.S. PATENT DOCUMENTS

| | | |
|---|---|---|
| 887,998 A1 | 10/2012 | Skelhorn |
| 10,864,767 B2 * | 12/2020 | Marsala ............... G05B 13/028 |
| 2004/0122648 A1 | 6/2004 | Ando et al. |
| 2005/0096796 A1 | 5/2005 | Filev |
| 2009/0157212 A1 | 6/2009 | McClanahan et al. |
| 2009/0240363 A1 | 9/2009 | Huges |
| 2012/0052317 A1 | 3/2012 | Shi |
| 2015/0127269 A1 | 5/2015 | Bell |
| 2016/0018318 A1 | 1/2016 | Borges |
| 2018/0296995 A1 | 10/2018 | Kinnen |
| 2019/0085182 A1 | 3/2019 | Goedhart |

\* cited by examiner

SYSTEM AND METHOD FOR SELECTING PAINT COMPOSITIONS BASED ON EXPECTED PAINT APPLICATION CONDITIONS

CROSS-REFERENCE TO RELATED PATENT APPLICATIONS

This application is a continuation of U.S. application Ser. No. 16/339,576, filed Apr. 4, 2019, which is a U.S. National Phase Application under 35 U.S.C. § 371 of International Patent Application No. PCT/CA2016/051156, filed Oct. 4, 2016, which is incorporated by reference as if expressly set forth in its entirety herein.

TECHNICAL FIELD

The present invention relates to a paint compositions and, more particularly, to different exterior paint compositions.

BACKGROUND

Exterior waterborne paint compositions are prepared for application under ideal conditions typically provided as "normal condition" with the instructions on the paint container itself. Unfortunately, the actual conditions are rarely ideal and exterior waterborne paint composition are too often not achieving expected performance or properties (e.g., application is difficult or impossible and/or film formation is hindered (e.g., not entirely completed) or prevented).

The present invention addresses this shortcoming.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of the present invention is directed to an expert system for computing an adjustment procedure for obtaining an adjusted exterior waterborne paint composition for an exterior surface to be painted at a paint application site. The system comprises a non-transitory memory, a processing module, a network interface module and different sets of software instructions stored in the non-transitory memory. The non-transitory memory comprises at least one record corresponding to a starting exterior waterborne paint composition comprising a plurality of base chemical compounds, a base value being associated with each one of the plurality of base chemical compounds in the starting exterior waterborne paint composition. The processing module comprises one or more processors. The network interface module comprises one or more physical network interface.

A first of the sets of software instructions, stored in the non-transitory memory, when executed by the processing module, obtain environmental conditions for the paint application site at geographical coordinates considering a request received for the paint application site through the network interface module from a remote device, the environmental conditions comprising relative humidity data for the geographical coordinates and temperature data for the geographical coordinates. A second of the sets of software instructions, stored in the non-transitory memory, when executed by the processing module, compute, based on the relative humidity data for the geographical coordinates, the temperature data for the geographical coordinates and substrate identification data for the exterior surface to be painted, a target value for each of a plurality of target chemical compounds in an adjusted exterior waterborne paint composition for the exterior surface to be painted. A third of the sets of software instructions, stored in the non-transitory memory, when executed by the processing module, determine when the plurality of target values is different from the plurality of base values. A fourth of the set of software instructions, stored in the non-transitory memory, when executed by the processing module upon determination that plurality of target values is different from the plurality of base values compute an adjustment procedure for transforming the starting exterior waterborne paint composition into the adjusted exterior paint composition for the exterior surface to be painted and send instructions, through the network interface module to the remote device, comprising the adjustment procedure for obtaining the adjusted exterior waterborne paint composition from the starting exterior waterborne paint composition for the exterior surface to be painted.

Optionally, computing the plurality of target values each associated with one of the plurality of target chemical compounds in the adjusted exterior paint composition may be performed considering an expected time of application. The expert system may further comprise a fifth set of software instructions, stored in the non-transitory memory, that, when executed by the processing module, obtain surface characteristics for the exterior surface to be painted with the adjusted exterior paint composition at the paint application site, the surface characteristics comprising the substrate identification data, sun position data for the geographical coordinates, a geographical alignment value of the exterior surface to be painted and an expected surface temperature for the exterior surface to be painted.

Optionally, computing the plurality of target values each associated with one of the plurality of target chemical compounds in the adjusted exterior paint composition further comprises measuring an actual surface temperature or computing an expected surface temperature value of the surface characteristics for the exterior surface considering the relative humidity data at the geographical coordinates and the temperature data for the geographical coordinates.

The environmental conditions may optionally further comprise, for the geographical coordinates, sun position data and expected cloud coverage data and computing the expected surface temperature value may then be performed further considering an expected time of application, the sun position data and the expected cloud coverage data (e.g., considering cloud coverage data from radar forecast, based on probability of precipitation forecast percentage, degree days forecast, etc.). The environmental conditions may further comprise, for the geographical coordinates, wind speed value and wind orientation value and computing the plurality of target values each associated with one of the plurality of target chemical compounds in the adjusted exterior paint composition may then further comprise computing the expected surface temperature value of the surface characteristics for the exterior surface considering the relative humidity data at the geographical coordinates, the temperature data for the geographical coordinates, the wind speed value at the geographical coordinates, the wind orientation value at the geographical coordinates and the geographical alignment value.

Optionally, the expert system may also be for transforming the starting exterior paint composition (e.g., a different container of the same composition or a different starting composition for a different substrate) into a second adjusted exterior paint composition for a second exterior surface to be painted at the paint application site at the geographical coordinates. The expert system may then further comprise a sixth and seventh sets of software instructions, stored in the non-transitory memory. The sixth set of software instructions, when executed by the processing module, compute, based on the environmental conditions and substrate identification data for the second exterior surface to be painted, a second plurality of target values each associated with one of the plurality of target chemical compounds in the second adjusted exterior paint composition for the second exterior surface to be painted. The seventh set of software instructions, when executed by the processing module upon determination that the second plurality of target values is different from the plurality of base values compute at the processing module of the expert system a second adjustment procedure for transforming the starting exterior paint composition into the second adjusted exterior paint composition for the second exterior surface to be painted. The instructions sent from the processing module of the expert system to the remote device may then further comprise a second adjustment procedure for obtaining the second adjusted exterior paint composition from the starting exterior paint composition for the second exterior surface to be painted.

Optionally, obtaining the surface characteristics may further comprise obtaining the surface characteristics for the second exterior surface to be painted with the second adjusted exterior paint composition at the paint application site, the surface characteristics comprising the second substrate identification data, a second geographical alignment value and a second expected surface temperature for the second exterior surface to be painted. Computing the second plurality of target values each associated with one of the plurality of target chemical compounds in the second adjusted exterior paint composition may optionally further comprise computing the second expected surface temperature value of the surface characteristics for the second exterior surface considering the relative humidity data at the geographical coordinates, the temperature data for the geographical coordinates and the second geographical alignment value for the second exterior surfaces. The environmental conditions may further comprise wind speed value at the geographical coordinates and wind orientation value at the geographical coordinates and computing the plurality of second target values each associated with one of the plurality of target chemical compounds in the second adjusted exterior paint composition may then further comprise computing the second expected surface temperature value of the surface characteristics the second exterior surface considering the relative humidity data at the geographical coordinates, the temperature data for the geographical coordinates, the wind speed value at the geographical coordinates, the wind orientation value at the geographical coordinates and the geographical alignment value for the second exterior surface.

The expert system may optionally further an eighth set of software instructions, stored in the non-transitory memory, that, when executed by the processing module, associate a tolerance interval with each of the plurality of target values, wherein the plurality of target values is determined different from the plurality of base values when at least one base value from the plurality of base values is outside of the corresponding tolerance interval. The plurality of associated tolerance interval may be a relative value established in relation to the starting exterior paint composition, the adjusted exterior paint composition and the associated target value or a corresponding base value. One or more of the plurality of associated tolerance interval may be an absolute volumetric value established in relation to a volume of a container of the starting exterior paint composition.

Optionally, the adjustment procedure may provide one or more volumetric values for one or more corresponding adjustment compounds for the plurality of target values to be determined equivalent to the plurality of base values. The plurality of target values may be determined equivalent to the plurality of base values when each of the plurality of base values is within the corresponding tolerance interval. A ninth set of software instructions, stored in the non-transitory memory, may optionally be provided that, when executed by the processing module, obtain a volume of a container for the starting exterior paint composition, wherein the adjustment one or more volumetric values are absolute volumetric values for each the corresponding adjustment compounds.

Optionally, the temperature data for the geographical coordinates may be provided as a temperature data range. Optionally, the expected temperature value may be provided as a temperature value range.

A second aspect of the present invention is directed to a method for transforming a starting exterior waterborne paint composition comprising a plurality of base chemical compounds into an adjusted exterior waterborne paint composition for an exterior surface to be painted, a base value being associated with each one of the plurality of base chemical compounds in the starting exterior waterborne paint composition. The method comprises, at a processing module of an expert system, obtaining environmental conditions for a paint application site at geographical coordinates, the environmental conditions comprising relative humidity data for the geographical coordinates and temperature data for the geographical coordinates. The method also comprises computing at the processing module of the expert system, based on the relative humidity data for the geographical coordinates, the temperature data for the geographical coordinates and substrate identification data for the exterior surface to be painted, a target value for each of a plurality of target chemical compounds in the adjusted exterior waterborne paint composition for the exterior surface to be painted. When the plurality of target values is determined different from the plurality of base values, the method follows with computing at the processing module of the expert system an adjustment procedure for transforming the starting exterior waterborne paint composition into the adjusted exterior paint composition for the exterior surface to be painted and, from the processing module of the expert system, sending instructions to a remote device comprising the adjustment procedure for obtaining the adjusted exterior waterborne paint composition from the starting exterior waterborne paint composition for the exterior surface to be painted.

Optionally, the plurality of target values each associated with one of the plurality of target chemical compounds in the adjusted exterior paint composition is performed considering an expected time of application.

The method may further optionally comprise, at the processing module of the expert system, obtaining surface characteristics for the exterior surface to be painted with the adjusted exterior paint composition at the paint application site, the surface characteristics comprising the substrate identification data, sun position data for the geographical coordinates, a geographical alignment value of the exterior surface to be painted and an expected surface temperature for the exterior surface to be painted.

Optionally, computing the plurality of target values each associated with one of the plurality of target chemical compounds in the adjusted exterior paint composition further comprises computing an expected surface temperature value of the surface characteristics for the exterior surface considering the relative humidity data at the geographical coordinates and the temperature data for the geographical coordinates. The environmental conditions may further comprise, for the geographical coordinates, sun position data and expected cloud coverage data and wherein computing the expected surface temperature value is performed further considering an expected time of application, the sun position data and the expected cloud coverage data.

The environmental conditions may further comprise, for the geographical coordinates, wind speed value and wind orientation value and computing the plurality of target values each associated with one of the plurality of target chemical compounds in the adjusted exterior paint composition may optionally further comprise computing the expected surface temperature value of the surface characteristics for the exterior surface considering the relative humidity data at the geographical coordinates, the temperature data for the geographical coordinates, the wind speed value at the geographical coordinates, the wind orientation value at the geographical coordinates and the geographical alignment value.

The method may optionally further be for transforming the starting exterior paint composition into a second adjusted exterior paint composition for a second exterior surface to be painted at the paint application site at the geographical coordinates and may then further comprise computing at the processing module of the expert system, based on the environmental conditions and substrate identification data for the second exterior surface to be painted, a second plurality of target values each associated with one of the plurality of target chemical compounds in the second adjusted exterior paint composition for the second exterior surface to be painted. When the second plurality of target values is determined different from the plurality of base values, the method continues with computing at the processing module of the expert system a second adjustment procedure for transforming the starting exterior paint composition into the second adjusted exterior paint composition for the second exterior surface to be painted. The instructions sent from the processing module of the expert system to the remote device may then further comprise a second adjustment procedure for obtaining the second adjusted exterior paint composition from the starting exterior paint composition for the second exterior surface to be painted.

Obtaining the surface characteristics may optionally comprises obtaining the surface characteristics for the second exterior surface to be painted with the second adjusted exterior paint composition at the paint application site, the surface characteristics comprising the second substrate identification data, a second geographical alignment value and a second expected surface temperature for the second exterior surface to be painted.

Optionally, computing the second plurality of target values each associated with one of the plurality of target chemical compounds in the second adjusted exterior paint composition may further comprise computing the second expected surface temperature value of the surface characteristics for the second exterior surface considering the relative humidity data at the geographical coordinates, the temperature data for the geographical coordinates and the second geographical alignment value for the second exterior surfaces. The environmental conditions may then further comprise wind speed value at the geographical coordinates and wind orientation value at the geographical coordinates and computing the plurality of second target values each associated with one of the plurality of target chemical compounds in the second adjusted exterior paint composition may further comprise computing the second expected surface temperature value of the surface characteristics the second exterior surface considering the relative humidity data at the geographical coordinates, the temperature data for the geographical coordinates, the wind speed value at the geographical coordinates, the wind orientation value at the geographical coordinates and the geographical alignment value for the second exterior surface.

The method may optionally further comprise, at the processing module of the expert system, associating a tolerance interval with each of the plurality of target values, wherein the plurality of target values is determined different from the plurality of base values when at least one base value from the plurality of base values is outside of the corresponding tolerance interval. Optionally, the plurality of associated tolerance interval is a relative value established in relation to the starting exterior paint composition, the adjusted exterior paint composition and the associated target value or a corresponding base value. Optionally, one or more of the plurality of associated tolerance interval is an absolute volumetric value established in relation to a volume of a container of the starting exterior paint composition.

The adjustment procedure may optionally provide one or more volumetric values for one or more corresponding adjustment compounds for the plurality of target values to be determined equivalent to the plurality of base values. The plurality of target values may then be determined equivalent to the plurality of base values when each of the plurality of base values is within the corresponding tolerance interval. Optionally, the method may comprise obtaining a volume of a container for the starting exterior paint composition, wherein the adjustment one or more volumetric values are absolute volumetric values for each the corresponding adjustment compounds.

Optionally, the temperature data for the geographical coordinates is provided as a temperature data range. Optionally, the expected temperature value is provided as a temperature value range.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figure 1:
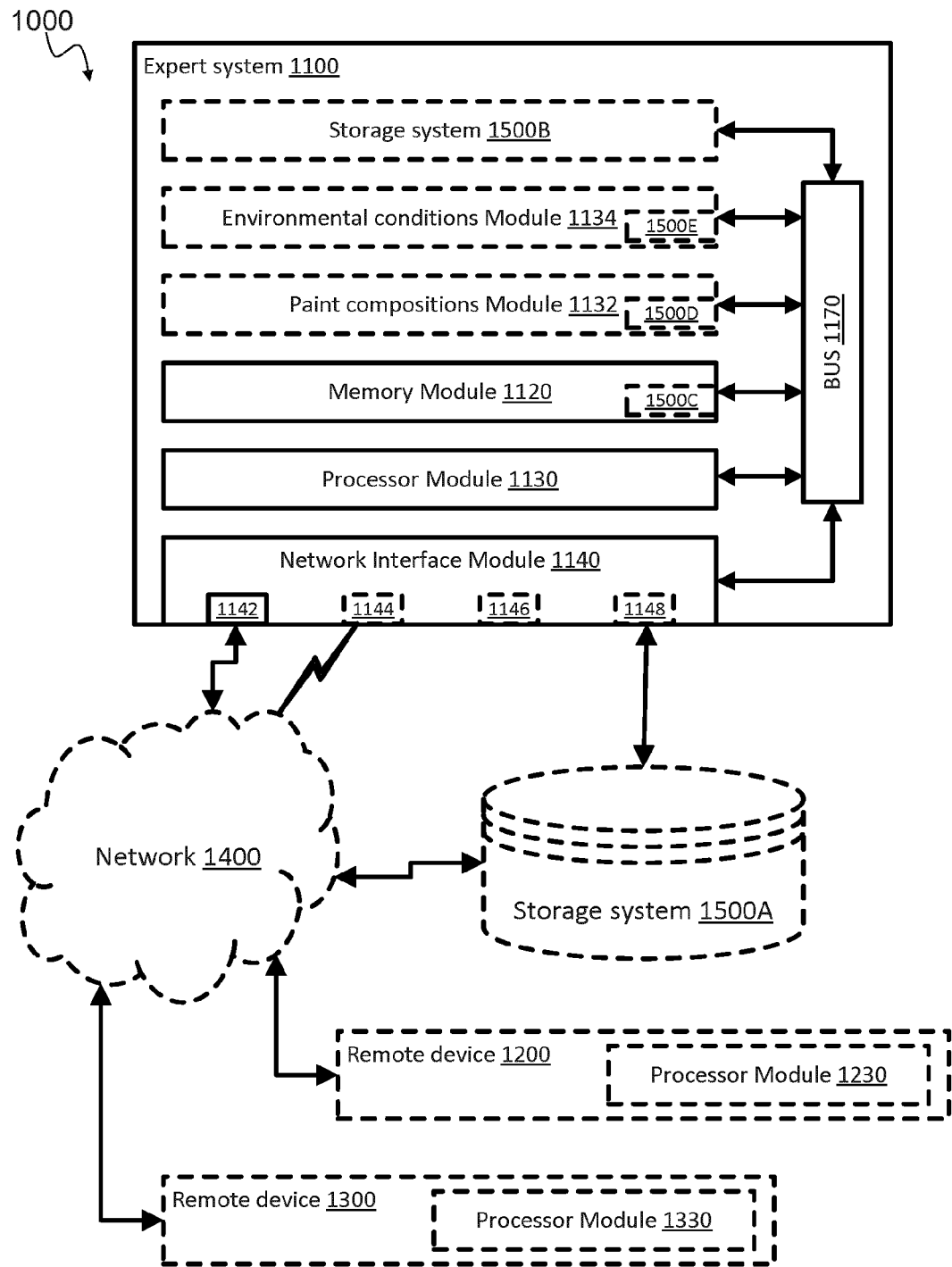
FIG. 1 is a module representation of an exemplary system in accordance with the teachings of the present invention.

It has been noticed that normal conditions of exterior paint application prescribed by exterior waterborne paint composition providers cannot easily be respected while allowing painters to have a reasonable work schedule. For instance, during hot days, the exterior paint could only be applied early in the morning, provided that dew is not present on the surface to be painted and/or late at night, provided that the surface to be painted has cooled enough by then. A similar situation happens during cooler days when exterior paint can only be applied when the surface has been sufficiently heated. Many painters/painting companies, therefore, apply exterior paint under different conditions that are less than ideal, causing exterior painted surfaces to exhibit issues such as undue peeling and/or discoloring.

The present invention generally relates to a system and a method for selecting between different starting exterior waterborne paint compositions and/or for selectively adjusting an exterior waterborne paint composition in accordance with expected conditions of application on a specific date. A starting exterior waterborne paint composition is provided with baseline-application conditions. The present invention relies on the possibility of adjusting, from the baseline-application conditions, for expected-application conditions on a specific time or day of application by selectively adding one or more chemical compounds to the starting exterior paint composition in order to obtain an adjusted exterior waterborne paint composition for that day or time. Final proportion(s) of the added chemical compound(s) in the adjusted exterior waterborne paint composition may be set within established tolerance intervals. A usual volume of starting exterior waterborne paint composition may be used to determine an actual volume to be added for each chemical compound. Different starting exterior waterborne paint compositions may also be provided and the method and system may therefore indicate which one of the starting exterior waterborne paint compositions is to be used and whether it is to be used without modification or actual volume(s) to be added for one or more chemical compounds.

The expected conditions comprise exterior substrate identification data and environmental conditions expected for a predetermined application day and/or time at which the exterior waterborne paint is expected to be applied. The expected conditions may also comprise application equipment characteristics (e.g., spray, brush, and roller), exterior substrate identification data including identification of a composition of the exterior surface (e.g., aluminum, plastic, wood and the like and/or previous surface treatment characteristics) and geographical characteristics of the exterior surface including spatial alignment thereof. The environmental conditions may be obtained from forecast(s) and/or actual measurement(s). Examples of environmental conditions include weather conditions (e.g., air temperature and/or surface temperature, wind speed and direction, relative humidity and cloud coverage) and sun position. In some embodiments, the expected conditions are determined only once and, accordingly, the starting exterior paint composition is selected/adjusted once. In other embodiments, the expected conditions are determined more than once (e.g., 24 hours before the application, when arriving on site and at the time of the application) and the starting exterior paint composition is adjusted more than once (while the starting exterior paint composition may be selected only once when more than one is available). As conditions change during application, the adjusted exterior paint composition may sometimes be adjusted again during application.

Reference is now made to the drawings, in which FIG. 1 shows a logical modular view of an exemplary expert system 1100 is depicted. The expert system 1100 is for computing an adjustment procedure for obtaining an adjusted exterior waterborne paint composition for an exterior surface to be painted at a paint application site on a specific date. The expert system comprises a processing module 1130, a memory module 1120 and a storage system 1500. In the depicted embodiment of FIG. 1, a networked group of computers 1000 comprises the expert system 1100. The networked group of computers 1000 is depicted with additional remote devices 1200 and 1300 that may send one or more request to the expert system 1100. The remote devices and the expert system 1100, 1200 and 1300 may be connected via a network 1400, via direct connections or a mix of direct and network connections. Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on links. Likewise, any number of routers and/or switches (not shown) may be present on links, which may further transit through the Internet.

The processing module(s) 1130, 1230 and/or 1330 may represent a single processor with one or more processor cores or an array of processors, each comprising one or more processor cores. The memory module 1120 may comprise various types of memory (different standardized or kinds of Random Access Memory (RAM) modules, memory cards, Read-Only Memory (ROM) modules, programmable ROM, etc.). The network interface module 1140 represents at least one physical interface that can be used to communicate with other network nodes. The network interface module 1140 may be made visible to the other modules of the computer system 1100 through one or more logical interfaces. The actual stacks of protocols used by the physical network interface(s) and/or logical network interface(s) 1142, 1144, 1146, 1148 of the network interface module 1140 do not affect the teachings of the present invention. The variants of processing module 1130, memory module 1120 and network interface module 1140 usable in the context of the present invention will be readily apparent to persons skilled in the art.

A bus 1170 is depicted as an example of means for exchanging data between the different modules of the computer system 1100. The present invention is not affected by the way the different modules exchange information between them. For instance, the memory module 1120 and the processing module 1130 could be connected by a parallel bus, but could also be connected by a serial connection or involve an intermediate module (not shown) without affecting the teachings of the present invention.

Likewise, even though explicit mentions of the memory module 1120 and/or the processing module 1130, or explicit mentions of other modules in the computer systems 1200 and 1300, are not made throughout the description of the various embodiments, persons skilled in the art will readily recognize that such modules are used in conjunction with other modules of the computer system 1100, 1200 and/or 1300 to perform routine as well as innovative steps related to the present invention. Similarly, two systems 1100 and 1200 or 1300 may be involved for obtaining an adjusted exterior waterborne paint composition for an exterior surface to be painted at a paint application site.

In some embodiments, the expert system 1100 may comprise a dedicated paint compositions module 1132 dedicated to storing paint composition data and/or computing paint compositions. In other embodiments, alternatively or in addition, functions of the paint compositions module 1132 are shared with the processing module 1130 and the storage system 1500 (e.g., the paint compositions module 1132 is a sub-module of the processing module 1130). For instance, the paint composition module may comprise and/or manage access to data records for one or more starting exterior paint compositions comprising resin chemistry data, surfactants characteristics, wetting agents characteristics and/or flow agents characteristics. The paint composition module may also comprise and/or manage access to data records for a plurality of adjusted exterior paint compositions comprising resin chemistry data, surfactants characteristics, wetting agents characteristics and/or flow agents characteristics. The adjusted exterior paint compositions may comprise one or more tolerance values for relative humidity in relation to temperature (e.g., air temperature or surface temperature). For instance, the tolerance values may be expressed as a range of relative humidity and temperatures that represent for proper application conditions for the adjusted exterior paint composition. The tolerance values may comprise more than one range (e.g., recommended conditions, acceptable conditions, non-acceptable conditions). The tolerance values are set in order to maintain appropriate flow characteristics of the adjusted exterior paint composition (i.e., avoid low of flow and excessive flow) and maintain appropriate drying characteristics of the adjusted exterior paint composition (i.e., allow a film to appropriately form and appropriately adhere to the substrate).

In some embodiments, the expert system 1100 may comprise a dedicated environmental conditions module 1134 dedicated to storing, computing and/or obtaining environmental conditions data. In other embodiments, alternatively or in addition, functions of the environmental conditions module 1134 are shared with the processing module 1130 and the storage system 1500 (e.g., the environmental conditions module 1134 is a sub-module of the processing module 1130). Environmental conditions data may include weather conditions (e.g., air temperature and/or surface temperature, wind speed and direction, relative humidity and cloud coverage) and sun position. The environmental conditions module 1134 obtain forecast(s) of relevant environmental conditions (e.g., interacting through the network interface module 1140 with a remote forecast provider) and/or actual measurement(s) of relevant environmental conditions (e.g., interacting with one or more instruments (not shown) local to the expert system 1000, local to the remote device 1200, 1300 and/or remote to both the expert system 1100 and the remote device 1200, 1300). The environmental conditions module 1134 may also store and/or compute temperature data for the exterior surface to be painted. For instance, surface temperature may be computed, measured directly, or measured directly and thereafter computed to provide an expected variability for a period of time such as a range of temperatures, a maximum value (e.g., when application is expected while air temperature is rising and/or sun is rising) and/or minimum value (e.g., when application is expected while air temperature is dropping and/or sun is setting).

FIG. 1 also shows examples of the storage system 1500 as a distinct database system 1500A, a distinct module 1500B of the computer system 1100, a sub-module 1500C of the memory module 1120 of the computer system 1100, a sub-module 1500D of the paint compositions module 1132 of the computer system 1100 or a sub-module 1500E of the environmental conditions module 1134 of the computer system 1100. The storage system 1500 may be distributed over different systems A, B, C, D and/or E or may be in a single system. The storage system 1500 may comprise one or more logical or physical as well as local or remote hard disk drive (HDD) (or an array thereof). The storage system 1500 may further comprise a local or remote database made accessible to the computer system 1100 by a standardized or proprietary interface or via the network interface module 1140. The variants of storage system 1500 usable in the context of the present invention will be readily apparent to persons skilled in the art.

Figure 2:
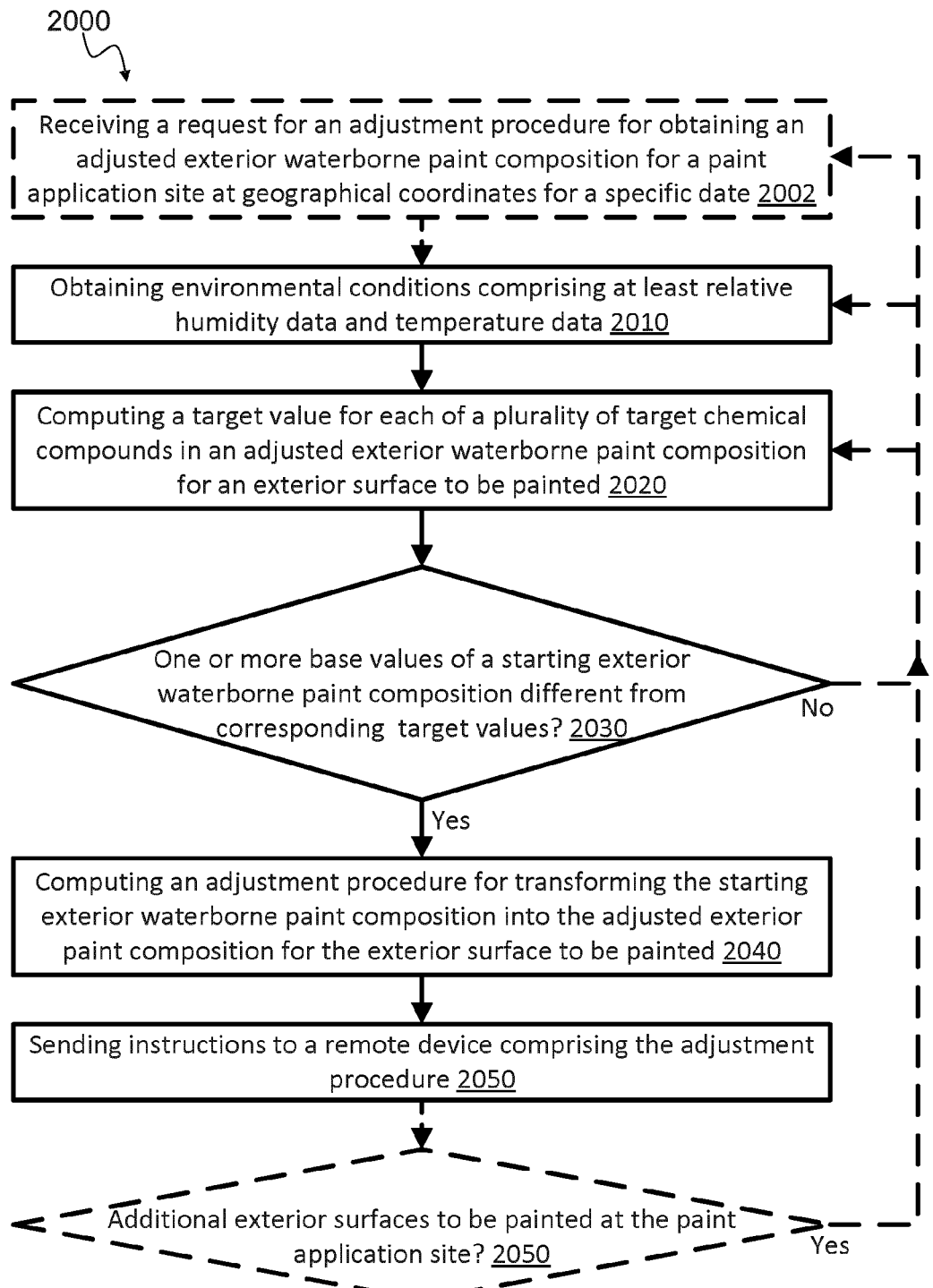
FIG. 2 is a flow chart of an exemplary method in accordance with the teachings of the present invention.

Reference is now concurrently made to FIG. 1 and FIG. 2, which show a flow chart of an exemplary method 2000 for computing an adjustment procedure for transforming a starting exterior waterborne paint composition comprising a plurality of base chemical compounds into an adjusted exterior waterborne paint composition for an exterior surface to be painted on a specific date. A base value is associated with each one of the plurality of base chemical compounds in the starting exterior waterborne paint composition.

The method 2000 comprises obtaining 2010 environmental conditions for a paint application site at geographical coordinates for the specific date by the processing module 1130 of the expert system 1100. The environmental conditions comprise relative humidity data for the geographical coordinates and temperature data for the geographical coordinates. The environmental conditions may also comprise sun position data, expected cloud coverage data and/or wind speed value and wind direction or orientation value. The environmental conditions may be obtained 2010 from a weather forecast provider (e.g., government agency, public or private weather network, etc.). The environmental conditions may be obtained 2010 alternatively or in addition from a weather instruments and/or actual measurements. The environmental conditions may also be obtained 2010 by computing data stored at the expert system 1100 and/or retrieved from the forecast provider and/or measurements by the expert system 1100 (e.g., sun position data may be computed from historical data and dew point may be computed from the relative humidity and temperature value). Skilled person will readily acknowledge that providing the dew point for the specific date may be sufficient to compute the relevant relative humidity data. The environmental conditions may be stored and retrieved and/or computed through the environmental conditions module 1134 of the expert system 1130.

In some embodiments, the environmental conditions are obtained 2010 only after receiving 2002 a request for the adjustment procedure from a remote device 1200, 1300 through the network interface module 1140. The expert system 1100 may obtain 2010 the environmental conditions partly or completely from the remote device 1200, 1300 (e.g., in the received 2002 request or in association with the received 2002 request). For instance, one or more instruments (not shown) of the remote device 1200, 1300 may be used in order to obtain at least some of the environmental conditions. Alternatively, or in addition, the remote device 1200, 1300 may communicate with the weather forecast provider (e.g., government agency, public or private weather network, etc.) and/or networked weather instruments to obtain some or all of the environmental conditions. The temperature data may also be represented by a temperature range.

The environmental conditions may be obtained 2010 for a default time on the specific date (e.g., noon). The environmental conditions may be obtained 2010 as mean values, minimum values and/or maximum values for the specific date or for one or more time periods on the specific date. For instance, the minimum and maximum temperature values may be obtained, the minimum and maximum relative humidity values may be obtained while only the maximum speed value is obtained and only the mean wind orientation value is obtained. When the environmental conditions are obtained 2010 for short time periods on the specific date (e.g., an hour or two hours), only means values may be required (e.g., mean values every hour for the specific date). The time period(s) may also correspond to the morning, afternoon and/or night on the specific date. The time periods may also be determined considering an expected time of application associated with one or more of the surfaces to be painted at the paint application site. For instance, different surfaces may be planned at different application times on the specific date and the different periods may be set in accordance with the expected application times (starting at 7:00 AM, for 2 hours→4 surface A; starting on 7:20, for 4 hours→4 surface B, starting at 12:00 PM, for 6 hours→4 surface C, etc.). A maximum time period length may also be set in order to avoid too much gap between the highest and lowest values for one or more of the environmental conditions. For instance, each time period may be limited to 2 hours.

In some embodiments, the environmental conditions 2010 are obtained only once e.g., the day before the specific date (e.g., considering forecast only) or on the specific date (e.g., considering forecast and/or measurements). In some embodiments, the environmental conditions 2010 are obtained more than once (e.g., on the day before the specific date and on the specific date). The adjustment procedure may be computed every time the environmental conditions are obtained 2010 or may be computed only when the environmental condition(s) obtained 2010 from one or more forecasts are determined to be reliable (e.g., considering forecast fluctuations throughout the period of time or throughout the specific date and/or highest/lowest probability of precipitation value(s)).

Once the environmental conditions are obtained 2010 for the paint application site at the geographical coordinates for the specific date by the processing module 1130 of the expert system 1100, the method 2000 follows with step 2020. In the step 2020, The processing module 1130 of the expert system 1100 computing 2020 a target value for each of a plurality of target chemical compounds in an adjusted exterior waterborne paint composition for an exterior surface to be painted. The plurality of target chemical compounds are computed 2020 based on the environmental conditions previously obtained 2010 and substrate identification data for the exterior surface to be painted. Specifically, the plurality of target chemical compounds are computed 2020 based at least on the relative humidity data for the specific date for the geographical coordinates, the temperature data for the specific date for the geographical coordinates and the substrate identification data for the specific date. Computing 2020 the plurality of target values each associated with one of the plurality of target chemical compounds in the adjusted exterior paint composition may also be performed considering an expected time of application for the specific date. Whenever relevant, the expected time of application may be determined from the period of times, used for obtaining 2010 the environmental conditions or vice-versa (i.e., the period of times being determined from the expected time of application).

In some embodiments, the method 2000 may also comprise obtaining (not shown) surface characteristics for the exterior surface to be painted with the adjusted exterior paint composition at the paint application site. The surface characteristics comprises the substrate identification data and may further comprise sun position data for the geographical coordinates, a geographical alignment value of the exterior surface to be painted and an actual and/or expected surface temperature for the exterior surface to be painted. Skilled persons will recognize that the substrate identification data may be obtained from one or more default values (i.e., the expert system 1100 is compatible with a single type of substrate or only one type of substrate at a time), may be provided in the received request 2002 or may otherwise be obtained by the expert system 1100 for the paint application site (e.g., provided by the customer or in database of historical contracts). The substrate identification data may be associated to one or more starting paint compositions. For instance, the substrate identification data may comprise identification of the exterior surface to be painted as being PVC cladding, aluminum cladding, wood, a pre-painted water-base surface, a pre-painted oil-base surface, etc. Each of a plurality of starting paint compositions may be associated to each of the substrates.

The geographical alignment value of the exterior surface may be provided with different degrees of granularity. For instance, the granularity main be limited to North, South, East or West (or closest 90°). As skilled person will recognize, the granularity could be set anywhere between high precision (to 1°, 5°, 10°, etc.) up to 90°.

Computing 2020 the plurality of target values each associated with one of the plurality of target chemical compounds in the adjusted exterior paint composition may further comprise computing (not shown), at the processing module 1130 of the expert system 1100, the actual and/or expected surface temperature value of the surface characteristics for the exterior surface considering the relative humidity data at the geographical coordinates and the temperature data for the geographical coordinates. Actual temperature of the surface to be painted may be obtained by direct measurement. For instance, an instrument may be applied to a significant portion of the surface to be painted. the instrument may be in communication with the remote device 1200/1300 (e.g., short range wireless such as Bluetooth or wired) or the expert system 1100 (long range wireless such as WIFI or LTE or wired) or may simply be read by a user to input a value into the Graphical user interface of the remote device 1200/1300. Sun position data, expected cloud coverage data and/or the expected time of application may further be considered by the expert system 1100 when computing the expected surface temperature value of the surface characteristics for the exterior surface to be painted. Likewise, the wind speed value at the geographical coordinates, the wind orientation value at the geographical coordinates and the geographical alignment value may be considered, alternatively or in addition, by the expert system 1100 when computing the expected surface temperature value. The expected surface temperature value may be represented by a temperature range. the temperature range may also be associated with a time range (e.g., between 23° C. and 26° C. between 10:00 and 12:00)

The method 2000 then continues by determining 2030 at the processing module 1130 of the exert system 1100 whether one or more base values of the starting exterior waterborne paint composition is different from corresponding target values as computed in 2020 by the expert system 1100. When the plurality of target values is determined in 2030 to be different from the plurality of base values, the method 2000 continues by computing 2040, at the processing module 1130 of the expert system 1100, an adjustment procedure for transforming the starting exterior waterborne paint composition into the adjusted exterior paint composition for the exterior surface to be painted. Once the procedure is computed 2040, the method continues with sending instructions 2050 to the remote device. the instructions sent 2050 comprise the adjustment procedure for obtaining the adjusted exterior waterborne paint composition from the starting exterior waterborne paint composition for the exterior surface to be painted.

In some embodiments, the adjustment procedure provides one or more volumetric values for one or more corresponding adjustment compounds for the plurality of target values to be determined equivalent to the plurality of base values. The plurality of target values may be determined equivalent to the plurality of base values when each of the plurality of base values is within corresponding tolerance interval(s). The method may then also comprise obtaining (not shown) a volume of a container for the starting exterior paint composition and the adjustment procedure may be absolute volumetric values for each the corresponding adjustment compounds. For instance, the adjustment compounds may comprise a surfactant or wetting agent for adjusting surface tension characteristics of the adjusted paint composition and/or a flow agent for adjusting levelling characteristics of the adjusted paint composition. Some other adjustment compounds may include rheology agent or rheology modifier (e.g., paint thickener) and coalescing solvents or filming agents (e.g., hydrophilic solvent, hydrophobic solvent). Different wetting, flow, rheology and/or filming agents (e.g., even from the same agent type, but having different "strength", premix of different agents, etc.) may alternatively or concurrently be specified in the adjustment procedure.

In some embodiments, the adjustment procedure provides a suggested duration of a mixing or shaking operation appropriately mixing the adjusted paint composition following addition of the adjustment compounds. The suggested duration may be set by default or may be computed by the processing module 1130 of the expert system 1100 considering the adjustment compounds added and/or total volume added (e.g., relative or absolute values).

The method 2000 may also optionally comprise associating (not shown) a tolerance interval with each of the plurality of target values. The plurality of target values is then determined 2030 different from the plurality of base values when at least one base value from the plurality of base values is outside of the corresponding tolerance interval. One or more of the plurality of associated tolerance intervals may be relative values established in relation to the starting exterior paint composition, in relation to the adjusted exterior paint composition and in relation to the associated target value or the corresponding base value. One or more of the plurality of associated tolerance intervals may be an absolute volumetric value established in relation to a volume of a container of the starting exterior paint composition or a remaining volume estimated or measured (e.g., weighted or measured volume).

In some embodiments, the starting paint composition may be a previously adjusted (or may be roughly adjusted) paint composition. A subsequent adjustment procedure (or sequential adjustment procedure) may then further be computed, i.e., similar to 2002-2050 with the previously adjusted paint composition as the starting paint composition. In such an example, the subsequent adjustment procedure may also indicate one or more adjustment compounds to be added. The subsequent adjustment procedure may yet also indicate to dilute the previously adjusted paint composition with a plain (i.e., non-adjusted) starting paint composition and, in some cases, to afterwards add one or more adjustment compounds following dilution.

In some embodiments, the method 2000 may be executed 2050 more than once for additional exterior surface(s) to be painted at the paint application site. The method may therefore allow to transform the starting exterior paint composition into a second adjusted exterior paint composition for a second exterior surface to be painted at the paint application site at the geographical coordinates (e.g., a second container of the same starting composition or a different starting composition selected based on the substrate identification of the second surface). Obtaining the surface characteristics may therefore further comprise obtaining the surface characteristics for the second exterior surface to be painted with the second adjusted exterior paint composition at the paint application site, the surface characteristics comprising the second substrate identification data, a second geographical alignment value and a second actual or expected surface temperature for the second exterior surface to be painted. For instance the same instrument used to measure the actual temperature of the first surface may be used for measuring the temperature of the second surface. The second expected surface temperature value of the surface characteristics may therefore be computed for the second exterior surface considering the relative humidity data at the geographical coordinates, the temperature data for the geographical coordinates and the second geographical alignment value for the second exterior surfaces, and/or wind speed value at the geographical coordinates and wind orientation value at the geographical coordinates.

In some embodiments, the remote device 1200/1300 comprises a graphical user interface (not shown) for interacting with one or more users (not shown) and may also be a smartphone, a tablet, a phablet, a computer (e.g., portable or fixed to a mobile unit) or other multi-purpose processing device. The remote device 1200/1300 may also comprise an adjustment compound distribution module (not shown) for receiving the adjustment procedure and selectively adding one or more adjustment compounds to the starting exterior paint composition in accordance with the adjustment procedure. The adjustment compound distribution module may be a module local to the remote device 1200/1300 (e.g., integrated therewith) or may be a standalone module (not shown) in communication with the remote device 1200/1300 (e.g., using Bluetooth or other short-range wireless protocol, over WIFI, over Ethernet, over USB, etc.). The remote device 1200/1300 may also comprise a paint mixer tool and/or paint shaker tool (not shown) for appropriately mixing the adjusted paint composition following addition of the adjustment compounds. Duration of the mixing or shaking operation may be controlled by the remote device 1200/1300, e.g., in accordance with the received adjustment procedure.

Figure 3:
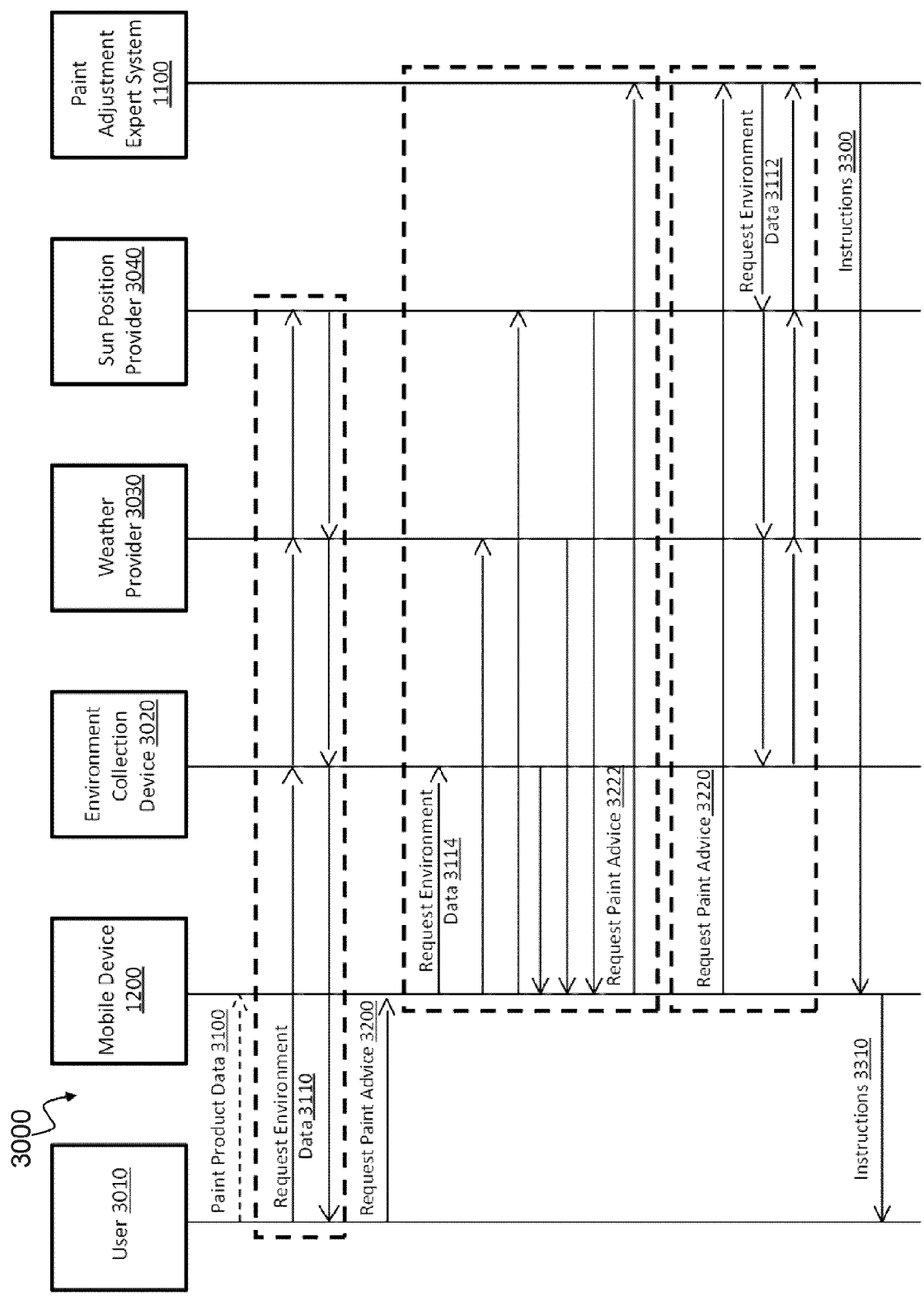
FIG. 3 is a flow and nodal operation chart in accordance with an embodiment of the present invention.

FIG. 3 shows a flow and nodal operation chart in accordance with an exemplary system 3000 in accordance with an embodiment of the present invention for providing instructions to a user 3010 for adjusting a starting waterborne paint composition for an exterior surface to be painted at a paint application site. The user 3010 has access to a mobile device 1200 and an environment collection device 3020. Also depicted in the example of FIG. 3 are a weather provider 3030, a sun position provider 3040 and a paint adjustment expert system 1100. The mobile device 1200 may comprise the environment collection device 3020 (e.g., as a submodule) or the environment collection device 3020 may be a standalone device. Likewise, weather and sun position may be provided by external providers 3030/3040 as depicted but may also be provided completely or partially (e.g., validated by external providers) by the mobile device 1200 and/or the environment collection device 3020.

In the example of FIG. 3, the user 3010 provides the mobile device 1200 with paint product data 3100. The paint product data may, for instance, identify the starting paint composition (e.g., by trademark and/or by chemical characteristics; providing volume or weight of paint, etc.) and one or more available adjustment compounds (e.g., by trademark and/or by chemical characteristics). The user 3010 may also input a specific date for the paint application or current date may be used. The user 3010 may also input an expected time for the paint application or current time may be used. The user 3010 may also input (not shown) a location for a paint application site. The location, date and/or time may also be obtained by the mobile device 1200 (e.g., using a GPS module thereof) and/or by the environment collection device 3020 (e.g., using a GPS module thereof). The location of the paint application site as well as additional information concerning the paint application site (e.g., number of exterior surfaces, substrate identification, alignment of exterior surfaces, etc.) may also be provided by the user 3010 and/or retrieved (not shown) from a database storing site-specific information. The location or another identifier (civic address, client name, etc.) may be used to retrieve the site-specific data from the database storing site-specific information.

In some embodiments, the user 3010 requests environmental conditions data 3110 to the environment collection device 3020. The environment collection device 3020 may then obtain data from the weather provider 3030 and the sun position provider 3040 before returning the requested environmental conditions data. The user 3010 may also directly request (not shown) the weather data from the weather data provider 3030 and the sun position data from the sun position provider 3040. In these embodiments, the user 3010 then provides the obtained environmental conditions data to the mobile device 1200 in a request for paint advice 3200.

Alternatively to obtaining the environmental conditions data by the user 3010, the user 3010 may send the request for paint advice 3200 without environmental conditions data. As a first option, the mobile device 1200 may then request 3114 environmental conditions data from the environment collection device 3020, the weather provider 3030 and the sun position provider 3040. The mobile device 1200 may alternatively request the environmental conditions data (not shown) from the environment collection device 3020, which may then in turn obtain data from the weather provider 3030 and the sun position provider 3040 before returning the requested environmental conditions data. The mobile device 1200 then sends a request 3222 for paint advice to the paint adjustment expert system 1100 with the obtained environmental conditions data. As a second option, the mobile device 1200 may send a request 3220 for paint advice to the paint adjustment expert system 1100 without environmental conditions data. The paint adjustment expert system 1100 may then request 3112 environmental conditions data from the environment collection device 3020, the weather provider 3030 and the sun position provider 3040. The paint adjustment expert system 1100 may alternatively request the environmental conditions data (not shown) from the environment collection device 3020, which may then in turn obtain data from the weather provider 3030 and the sun position provider 3040.

The paint adjustment expert system 1100 may receive (not shown) a specific date of application and/or an expected time of application or may alternatively, or by default if none are received, use the current date and time. A default time may also be predetermined (e.g., noon) or only the specific date without expected time may be used by the paint adjustment expert system 1100. The paint adjustment expert system 1100 may also obtain (not shown) a location for a paint application site (e.g., from a database storing site-specific information, from the mobile device 1200 (e.g., using a GPS module thereof) and/or by the environment collection device 3020 (e.g., using a GPS module thereof)). The location of the paint application site as well as additional information concerning the paint application site (e.g., number of exterior surfaces, substrate identification, alignment of exterior surfaces, etc.) may also be obtained (not shown) by the paint adjustment expert system 1100 from the database storing site-specific information. The location or another identifier (civic address, client name, etc.) may be used to retrieve the site-specific data from the database storing site-specific information.

Once the paint adjustment expert system 1100 obtains the environmental conditions data together with location and other relevant information for the paint application site, an adjustment procedure is computed by the paint adjustment expert system 1100. Instructions are then sent 3300 therefrom towards the mobile device 1200 comprising the adjustment procedure for obtaining the adjusted exterior waterborne paint composition from the starting exterior waterborne paint composition for the exterior surface to be painted. The mobile device 1200 then provides the instructions 3310 to the user 3010 (e.g., using a Graphical User Interface (GUI) thereof). As mentioned with reference to other examples, some or all of the steps depicted on FIG. 3 may be repeated for different application sites, repeated for different surfaces at a single paint application site and/or repeated for a single surface at different time.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as data, bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. An expert system for computing an adjustment procedure for obtaining an adjusted exterior waterborne paint composition for an exterior surface to be painted at a paint application site, the system comprising:
   a non-transitory memory comprising at least one record corresponding to a starting exterior waterborne paint composition comprising a plurality of base chemical compounds, a base value being associated with each one of the plurality of base chemical compounds in the starting exterior waterborne paint composition;
   a processing module comprising one or more processors;
   a network interface module comprising one or more physical network interface; —a first set of software instructions, stored in the non-transitory memory, the first set of software instructions, when executed by the processing module, obtain environmental conditions for the paint application site at geographical coordinates, the environmental conditions comprising relative humidity data for the geographical coordinates and temperature data for the geographical coordinates;

a second set of software instructions, stored in the non-transitory memory, the second set of software instructions, when executed by the processing module, compute, based on the relative humidity data for the geographical coordinates, the temperature data for the geographical coordinates and substrate identification data for the exterior surface to be painted, a target value for each of a plurality of target chemical compounds in an adjusted exterior waterborne paint composition for the exterior surface to be painted;

a third set of software instructions, stored in the non-transitory memory, the third set of software instructions, when executed by the processing module, determine when the plurality of target values is different from the plurality of base values; —a fourth set of software instructions, stored in the non-transitory memory, the fourth set of software instructions, when executed by the processing module upon determination that plurality of target values is different from the plurality of base values:

compute an adjustment procedure for transforming the starting exterior waterborne paint composition into the adjusted exterior paint composition for the exterior surface to be painted.

2. The expert system of claim 1, wherein computing the plurality of target values each associated with one of the plurality of target chemical compounds in the adjusted exterior paint composition is performed considering an expected time of application.

3. The expert system of claim 1, further comprising a fifth set of software instructions, stored in the non-transitory memory, the fifth set of software instructions, when executed by the processing module, obtain surface characteristics for the exterior surface to be painted with the adjusted exterior paint composition at the paint application site, the surface characteristics comprising the substrate identification data, sun position data for the geographical coordinates, a geographical alignment value of the exterior surface to be painted and a surface temperature for the exterior surface to be painted.

4. The expert system of claim 3, wherein the environmental conditions further comprise, for the geographical coordinates, wind speed value and wind orientation value and wherein computing the plurality of target values each associated with one of the plurality of target chemical compounds in the adjusted exterior paint composition further comprises computing the surface temperature value of the surface characteristics for the exterior surface considering the relative humidity data at the geographical coordinates, the temperature data for the geographical coordinates, the wind speed value at the geographical coordinates, the wind orientation value at the geographical coordinates and the geographical alignment value.

5. The expert system of claim 3, for transforming the starting exterior paint composition into a second adjusted exterior paint composition for a second exterior surface to be painted at the paint application site at the geographical coordinates, further comprising:

a sixth set of software instructions, stored in the non-transitory memory, the sixth set of software instructions, when executed by the processing module, compute, based on the environmental conditions and substrate identification data for the second exterior surface to be painted, a second plurality of target values each associated with one of the plurality of target chemical compounds in the second adjusted exterior paint composition for the second exterior surface to be painted; —a seventh set of software instructions, stored in the non-transitory memory, the seventh set of software instructions, when executed by the processing module upon determination that the second plurality of target values is different from the plurality of base values:

compute at the processing module of the expert system a second adjustment procedure for transforming the starting exterior paint composition into the second adjusted exterior paint composition for the second exterior surface to be painted.

6. The expert system of claim 1, wherein computing the plurality of target values each associated with one of the plurality of target chemical compounds in the adjusted exterior paint composition further comprises computing an expected surface temperature value of the surface characteristics for the exterior surface considering the relative humidity data at the geographical coordinates and the temperature data for the geographical coordinates.

7. The expert system of claim 6, wherein the environmental conditions further comprise, for the geographical coordinates, sun position data and expected cloud coverage data and wherein computing the expected surface temperature value is performed further considering an expected time of application, the sun position data and the expected cloud coverage data.

8. The expert system of claim 1, further comprising, a fifth set of software instructions, stored in the non-transitory memory, the fifth set of software instructions, when executed by the processing module, associate a tolerance interval with each of the plurality of target values, wherein the plurality of target values is determined different from the plurality of base values when at least one base value from the plurality of base values is outside of the corresponding tolerance interval.

9. The expert system of claim 8, wherein the plurality of associated tolerance interval is a relative value established in relation to the starting exterior paint composition, the adjusted exterior paint composition and the associated target value or a corresponding base value.

10. The expert system of claim 9, wherein one or more of the plurality of associated tolerance interval is an absolute volumetric value established in relation to a volume of a container of the starting exterior paint composition.

11. The expert system of claim 8, wherein the plurality of target values is determined equivalent to the plurality of base values when each of the plurality of base values is within the corresponding tolerance interval.

12. The expert system of claim 11, further comprising a sixth set of software instructions, stored in the non-transitory memory, the sixth set of software instructions, when executed by the processing module, obtain a volume of a container for the starting exterior paint composition, wherein the adjustment one or more volumetric values are absolute volumetric values for each the corresponding adjustment compounds.

13. The expert system of claim 1, wherein the adjustment procedure provides one or more volumetric values for one or more corresponding adjustment compounds for the plurality of target values to be determined equivalent to the plurality of base values.

14. A method for transforming a starting exterior waterborne paint composition comprising a plurality of base chemical compounds into an adjusted exterior waterborne paint composition for an exterior surface to be painted, a base value being associated with each one of the plurality of base chemical compounds in the starting exterior waterborne paint composition, the method comprising:

- at a processing module of an expert system, obtaining environmental conditions for a paint application site at geographical coordinates, the environmental conditions comprising relative humidity data for the geographical coordinates and temperature data for the geographical coordinates; —computing at the processing module of the expert system, based on the relative humidity data for the geographical coordinates, the temperature data for the geographical coordinates and substrate identification data for the exterior surface to be painted, a target value for each of a plurality of target chemical compounds in the adjusted exterior waterborne paint composition for the exterior surface to be painted;
- when the plurality of target values is determined different from the plurality of base values:
    - computing at the processing module of the expert system an adjustment procedure for transforming the starting exterior waterborne paint composition into the adjusted exterior paint composition for the exterior surface to be painted.

15. The method of claim 14, wherein computing the plurality of target values each associated with one of the plurality of target chemical compounds in the adjusted exterior paint composition is performed considering an expected time of application.

16. The method of claim 14, further comprises obtaining surface characteristics for the exterior surface to be painted with the adjusted exterior paint composition at the paint application site, the surface characteristics comprising the substrate identification data, sun position data for the geographical coordinates, a geographical alignment value of the exterior surface to be painted and a surface temperature for the exterior surface to be painted.

17. The method of claim 14, further comprising associating a tolerance interval with each of the plurality of target values, wherein the plurality of target values is determined different from the plurality of base values when at least one base value from the plurality of base values is outside of the corresponding tolerance interval.

18. The method of claim 17, wherein the plurality of target values is determined equivalent to the plurality of base values when each of the plurality of base values is within the corresponding tolerance interval.

19. The method of claim 14, wherein the adjustment procedure provides one or more volumetric values for one or more corresponding adjustment compounds for the plurality of target values to be determined equivalent to the plurality of base values.

* * * * *